United States Patent Office 3,152,151
Patented Oct. 6, 1964

3,152,151
DIOXABORINANE AZIDE COMPOUNDS
Herbert C. Newsom, Whittier, Calif., assignor to United States Borax & Chemical Corporation, Los Angeles, Calif., a corporation of Nevada
No Drawing. Filed Mar. 25, 1963, Ser. No. 267,824
2 Claims. (Cl. 260—349)

This invention relates to organic boron azide compounds, and more particularly, it relates to novel 2-azidodioxaborinane compounds.

It is, therefore, the principal object of this invention to provide, as new compositions, 2-azidodioxaborinane compounds.

Other objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

According to the present invention, there are provided the compounds of the formula

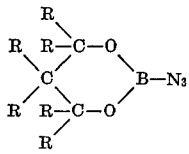

where R is selected from the group consisting of hydrogen and alkyl of from 1 to about 4 carbon atoms. Thus, each R in the above formula can represent the same or different alkyls or hydrogen. The presently preferred compounds are those in which at least one of said R's represents an alkyl of 1 to about 4 carbon atoms. Examples of suitable alkyl groups represented by R include methyl, ethyl, propyl, isopropyl and butyl.

The compounds, which can be named as 2-azido-1,3-dioxa-2-borinane and its alkyl analogues, are useful as blowing agents for organic polymers. It has also been found that the compounds themselves will form foamed resinous material when heated to an elevated temperature such as about 150° C. The compounds are colorless liquids which are soluble in the usual hydrocarbon and ether solvents. Since they are readily hydrolyzed, they should preferably be kept in a dry atmosphere, avoiding contact with water or alcohols.

The 2-azidodioxaborinane compounds are readily prepared by reaction of anhydrous hydrazoic acid with the corresponding 2-halodioxazorinane, as illustrated by the following equation:

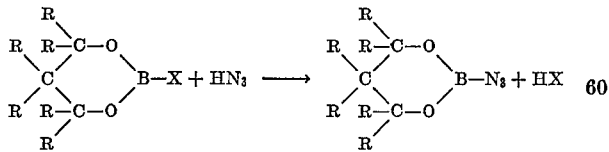

where R represents a member of the group consisting of hydrogen and alkyl of from 1 to about 4 carbon atoms and X represents a bromine or chlorine atom. Preferably, substantially equimolar amounts of the reactants are used so as to obtain best yields of the desired product. The reaction takes place at about room temperature or slightly above room temperature, with good yields of the desired product. Preferably, the reactants are heated slightly in an inert organic solvent, such as methylene chloride, so as to maintain efficient control of the reaction temperature and also to facilitate removal of the byproduct hydrogen halide as it is evolved. The desired product can be isolated and purified by conventional procedures. For example, the solvent is removed by distillation and the residue then distilled under reduced pressure to give the purified product. In distilling the product, however, the material should not be heated to a temperature above about 100° C. since decomposition and/or polymerization of the product will take place.

The intermediate 2-halodioxaborinanes can be prepared by the reaction of the corresponding polyglycol diborate with a halogenating agent such as boron tribromide or phosphorus pentachloride as described by Birum and Dever, U.S. Patent 3,064,032, issued November 13, 1962.

The following example illustrates the preparation of a representative compound of this invention, but it is to be understood that the invention is not to be limited to the specific example given.

*Example*

A solution of anhydrous hydrazoic acid (0.18 mole) in 996 ml. of methylene chloride was added to 29.3 grams (0.18 mole) of 2-chloro-4,4,6-trimethyl-1,3-dioxa-2-borinane in 50 ml. of methylene chloride in a nitrogen-flushed round-bottomed flask equipped with a condenser topped with a Dewar condenser at −60° C. The reaction proceeded at room temperature for about 20 hours and then at reflux for about 15 hours. The solvent was removed by distillation and the residual product fractionally distilled under reduced pressure to give 14.3 grams (47.3% yield) of 2-azido-4,4,6-trimethyl-1,3-dioxa-2-borinane, B.P. 53°–57° C./0.75 mm. The infrared spectrum was consistent with the assigned structure.

*Analysis.*—Calculated for $C_6H_{11}BN_3O_2$: B, 6.45%. Found: B, 6.42%.

The following are among the many other compounds embraced by the present invention, and may be prepared according to the directions given above:

2-azido-1,3-dioxa-2-borinane
2-azido-4-methyl-1,3-dioxa-2-borinane
2-azido-5,5-dimethyl-1,3-dioxa-2-borinane
2-azido-5-methyl-5-ethyl-1,3-dioxa-2-borinane
2-azido-5,5-dibutyl-1,3-dioxa-2-borinane Other modes of applying the principle of the invention may be employed, change being made as regards the details described, provided the features stated in any of the following claims or the equivalent of such be employed.

I, therefore, particularly point out and distinctly claim as my invention:

1. A compound of the formula

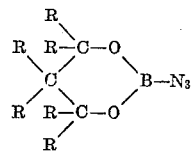

where R is selected from the group consisting of hydrogen and alkyl of from 1 to about 4 carbon atoms.

2. 2-azido-4,4,6-trimethyl-1,3-dioxa-2-borinane.

No references cited.